United States Patent [19]
Castel et al.

[11] Patent Number: 5,454,224
[45] Date of Patent: Oct. 3, 1995

[54] BRAKE DEVICE WITH RIGID MOUNTING

[75] Inventors: Philippe Castel, Paris; Jacques Laurent, Pavillons Sous Bois, both of France

[73] Assignee: Allied Signal Europe Services Techniques, Drancy, France

[21] Appl. No.: 122,557
[22] PCT Filed: Sep. 10, 1993
[86] PCT No.: PCT/FR93/00865
  § 371 Date: Sep. 30, 1993
  § 102(e) Date: Sep. 30, 1993
[87] PCT Pub. No.: WO94/07724
  PCT Pub. Date: Apr. 14, 1994

[30] Foreign Application Priority Data

Oct. 7, 1992 [FR] France ................... 92 11861

[51] Int. Cl.⁶ .................. B60T 13/00; F15B 9/10
[52] U.S. Cl. ........................... 60/547.1; 91/376 R
[58] Field of Search .................. 60/533, 547.1; 92/48, 96; 91/369.1, 376 R

[56] References Cited

U.S. PATENT DOCUMENTS

| 2,731,797 | 1/1956 | Ayers et al. | |
| 4,433,614 | 2/1984 | Takeuchi et al. | 91/376 R |
| 4,538,503 | 9/1985 | Hachiro | 91/376 R |
| 4,586,580 | 5/1986 | Spielmann et al. | 60/547.1 X |
| 5,193,344 | 3/1993 | Meynier | 91/376 R X |

FOREIGN PATENT DOCUMENTS

| 2017852 | 10/1979 | Germany . |
| 9109689 | 1/1993 | Germany . |
| 2018923 | 10/1979 | United Kingdom . |

Primary Examiner—Edward K. Look
Assistant Examiner—Hoang Nguyen
Attorney, Agent, or Firm—Larry J. Palguta; Leo H. McCormick, Jr.

[57] ABSTRACT

The invention relates to a rigid mounting for a brake unit with pneumatic booster (2) the walls of which can be lightened. The booster comprises an internal reinforcement (9) in the shape of a hat with a rim, the bottom (9a) of which is attached to the master cylinder (1) and the rim (9b) of which applies the booster against the perimeter of an aperture (5a) of the apron (5) of the vehicle.

4 Claims, 2 Drawing Sheets

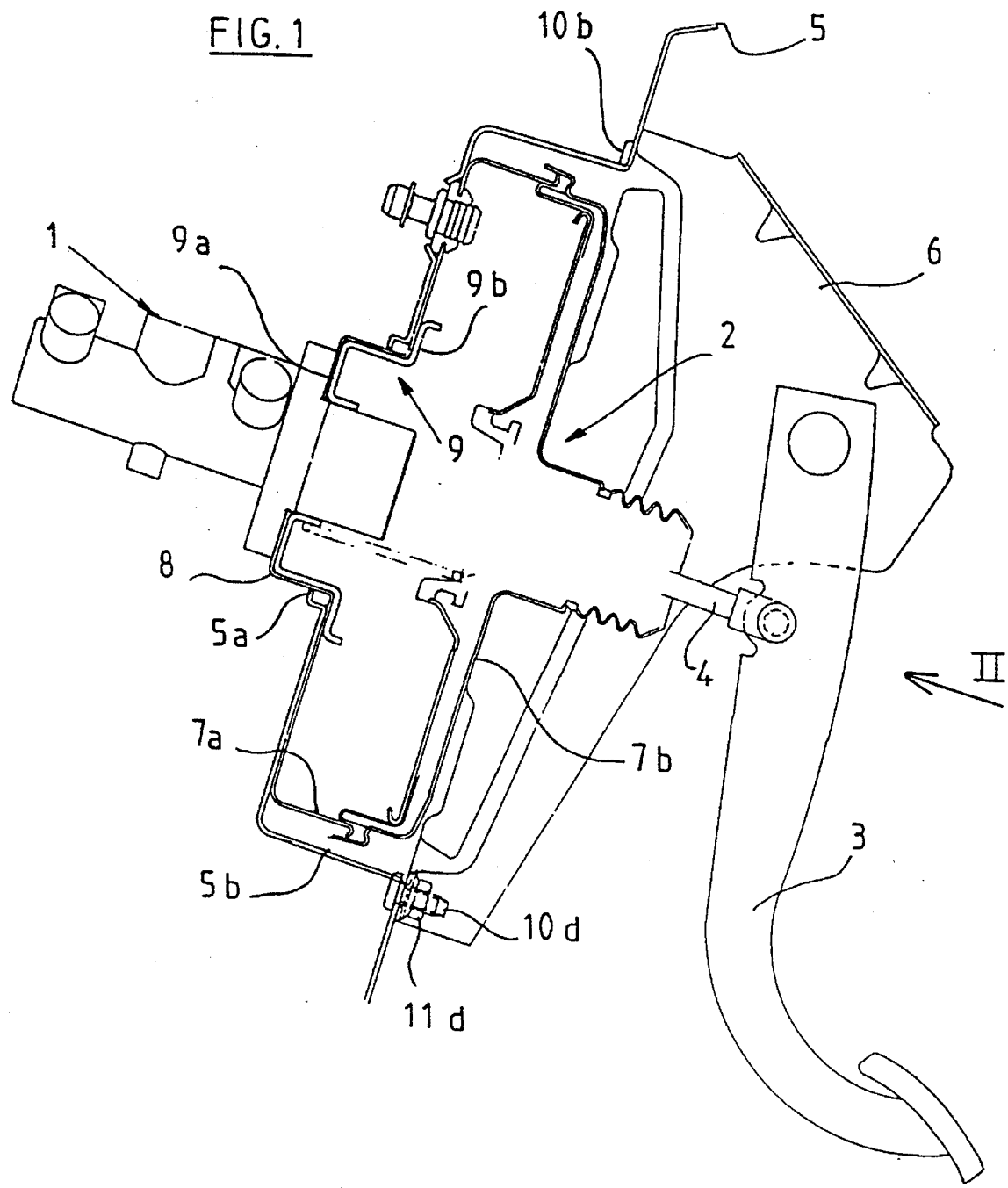

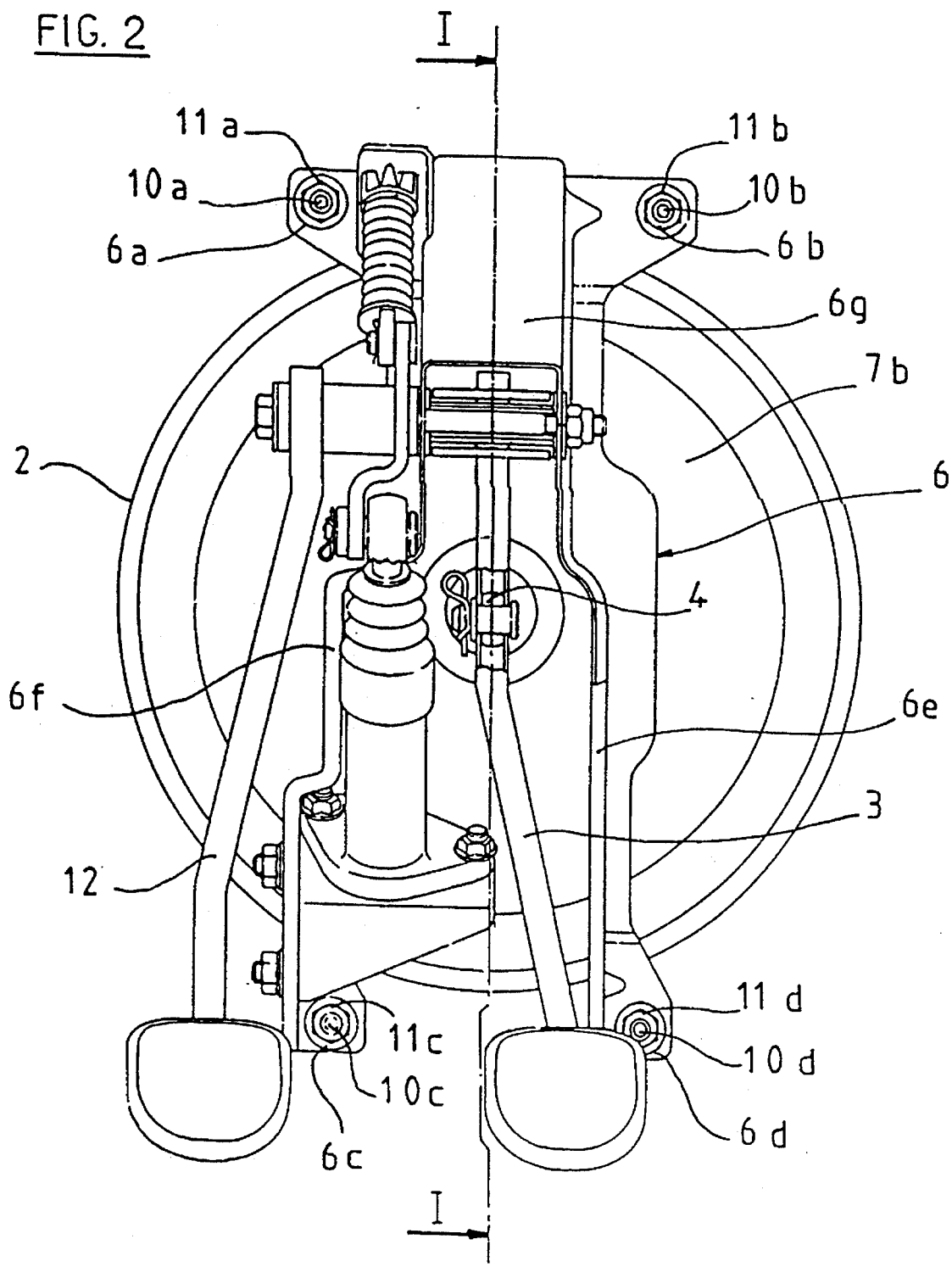

BRAKE DEVICE WITH RIGID MOUNTING

The present invention relates to a brake-booster device for a motor vehicle, comprising, as members, a master cylinder, a pneumatic booster actuating the master cylinder, a brake pedal actuating the booster through the intermediary of a control rod, an apron, and mechanical means designed to maintain the members of the device in a predetermined functional configuration and including a pedal support and an aperture in the bulkhead, the booster per se comprising a leaktight casing formed of two half-shells the first of which is connected to the master cylinder and the second to the brake pedal.

These devices are well known in the prior art and are in practice used on all private vehicles equipped with assisted braking. In particular, a device of the previously defined type is described in the document GB-A-2 018 923.

One of the permanent objectives in the design and the production of such devices is to reduce their cost and/or their weight while seeking to improve their functional qualities.

In particular, one of these objectives is to reduce the quantities of material required for the production of these devices, while conserving or improving their rigidity and their mechanical strength in operation.

Although the device known from the document GB-A-2 018 923 has this same objective, it requires the use of a thick holding flange which substantially increases the weight of the booster.

The device of the invention is included in this process and attains this objective by providing that the mechanical means mentioned above comprises:

an aperture in the bulkhead;

a protuberance of the first half-shell, this protuberance being engaged through the aperture of the apron and closing it at least partially;

a reinforcement in the shape of a hat with a rim, pushed home inside the protuberance, this reinforcement having on the one hand a pierced bottom supporting the master cylinder and in which the latter is engaged, and on the other hand a rim pressing the first half-shell, at the periphery of its protuberance, onto the edge of the aperture of the apron; and at least first attachment means for attaching to the apron the pedal support at a first attachment point of the latter.

Preferably, this device further comprises at least second attachment means for attaching to the apron the pedal support at a second attachment point of the latter, the first and second attachment points being disposed on either side of the booster in substantially symmetrical manner with respect to the control rod.

Moreover, it is advantageous for the apron to have a cavity at the bottom of which is pierced the said aperture and in which is housed the booster with the exception of its protuberance, and for the first and second attachment points to be disposed on either side of this cavity.

According to one embodiment, which is very simple to implement, the pedal support comprises two side plates connected to one another and is obtained by bending a single part.

The invention will now be described by way of example with reference to the accompanying drawings in which:

FIG. 1 is a view in cross section of a device according to the invention, made along line I—I of FIG. 2; and FIG. 2 is a front view of this device, seen in the direction of the arrow II appearing in FIG. 1.

The device of the invention comprises a master cylinder 1, a booster 2 supporting the master cylinder and adapted to control it, a brake pedal 3 capable of actuating the booster 2 through the intermediary of a control rod 4, an apron 5 belonging to the vehicle, and various mechanical means for attaching the assembly, rigidifying it and more generally maintaining it in its functional configuration, these means including a pedal support 6.

The booster 2 comprises a leaktight casing formed of two half-shells 7a, 7b the first of which is connected to the master cylinder and the second to the brake pedal.

As shown in FIG. 1, the apron 5 is pierced with a circular aperture 5a through which passes with a minimal clearance a cylindrical protuberance 8 of the first half-shell 7a of the booster 2.

A reinforcement 9 in the shape of a hat with a rim, the external shape of which fits the internal shape of the half-shell 7a on the side of the protuberance 8, is pushed home inside the latter.

The bottom 9a of this reinforcement is pierced and receives the master cylinder 1 to which it is attached, whereas the rim 9b of this reinforcement presses the first half-shell 7a, at the periphery of the protuberance 8, against the surface bordering the aperture 5a of the apron 5, the securing of the various assembled parts being performed by any known means.

Attachment means, such as bolts and nuts 10a, 11a, 10b, 11b, 10c, 11c and 10d, 11d, serve to attach the pedal support 6 to the apron at at least one attachment point, and in this case at four attachment points 6a, 6b, 6c and 6d.

These attachment points are preferably substantially symmetrical with one another two by two with respect to the control rod 4.

As shown in FIG. 2, the pedal support 6 advantageously comprises two side plates 6e, 6f connected to one another by a bridge 6g, parallel to one another and to the direction of the control rod 4, this support being constructed by bending a single part.

Such a disposition, as shown in FIG. 2, permits in particular the mounting of the clutch pedal 12 on the same support 6 as the brake pedal 3.

Moreover, as shown in FIG. 1, the apron 5 may have a cavity 5b at the bottom of which is pierced the circular aperture 5a, and in which the first shell 7a is housed, with the exception of its cylindrical protuberance 8, the pedal support 6 then being attached to the apron 5 at points located at the edge of this cavity.

We claim:

1. A brake-booster device for a motor vehicle, comprising, as members, a master cylinder, a pneumatic booster actuating the master cylinder, a brake pedal actuating the booster through the intermediary of a control rod, an apron, an aperture in the apron and delimited by an edge, and mechanical means for maintaining the members of the device in a predetermined functional configuration and including a pedal support, the booster comprising a leaktight casing formed of first and second half-shells, the first half-shell being connected to the master cylinder and the second to the brake pedal, wherein said mechanical means comprises a protuberance of the first half-shell, said protuberance being engaged through the aperture of the apron and closing said aperture at least partially;

a hat-shaped reinforcement extending inside the protuberance, said reinforcement having a pierced bottom supporting and surrounding the master cylinder and a rim pressing the first half-shell onto the edge of the aperture of the apron; and at least first attachment means for attaching the pedal support to the apron at a first attachment point of the pedal support.

2. The device according to claim 1, further comprising at least second attachment means for the pedal support to the apron at a second attachment point of said pedal support, the first and second attachment points being disposed on either side of the booster in substantially symmetrical manner with respect to the control rod.

3. The device according to claim 2, wherein the apron has a cavity with a bottom and said aperture located at the bottom of said cavity, at least the first half-shell of the booster with the exception of the protuberance being housed in said cavity, and the first and second attachment points disposed on either side of the cavity.

4. The device according to claim 1, wherein said pedal support comprises two side plates connected to one another and obtained from forming a single part.

* * * * *